Dec. 8, 1959  H. FINBERG  2,915,941
PHOTOGRAPHIC PROJECTION EASEL
Filed Jan. 3, 1958
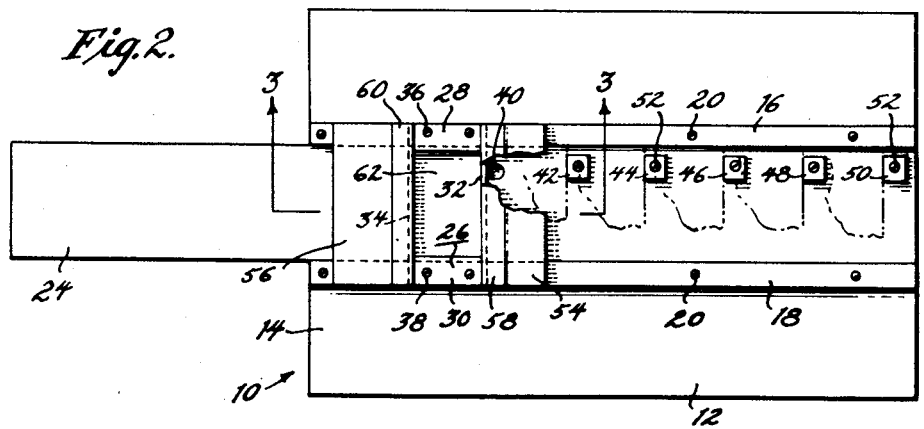
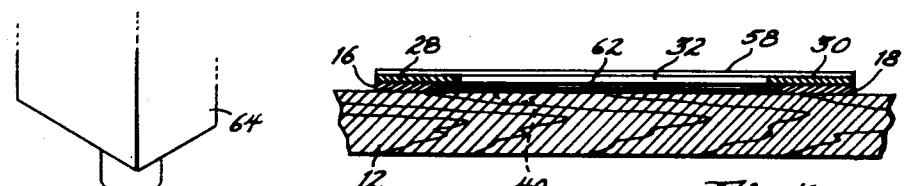
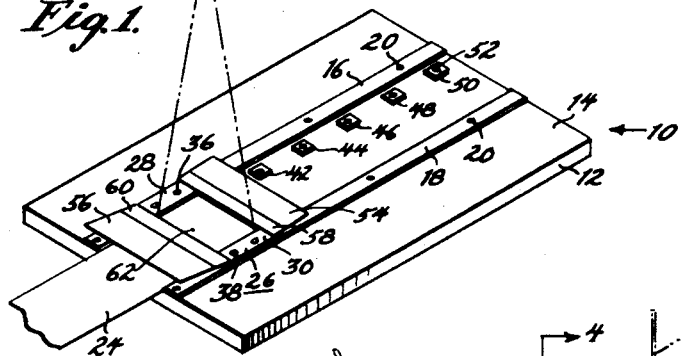
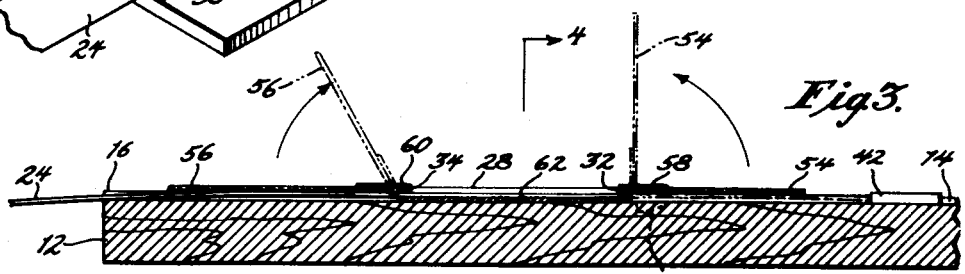
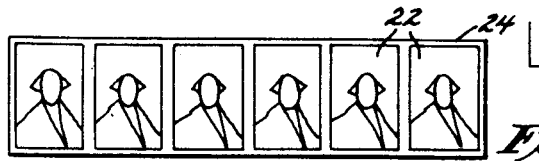
INVENTOR.
HARRY FINBERG
BY Arthur H. Seidel
ATTORNEY.

United States Patent Office 2,915,941
Patented Dec. 8, 1959

2,915,941

PHOTOGRAPHIC PROJECTION EASEL

Harry Finberg, Philadelphia, Pa.

Application January 3, 1958, Serial No. 706,925

3 Claims. (Cl. 88—24)

The present invention relates to a photographic printing board, and more particularly to a projection easel for producing a plurality of positive prints upon an elongated strip of photographic printing paper.

There has long been a need for a photographic projection easel which may be utilized by small professional photographic establishments for the printing of a plurality of positives in rapid order. In particular, it has long proved desirable to have a projection easel which may be used for wallet-size positives, which positives may be printed rapidly and uniformly onto a single strip of printing paper.

This invention has as an object the provision of a novel photographic projection easel.

This invention has as another object the provision of a photographic projection easel which facilitates rapid spaced positive prints upon a single strip of printing paper.

Other objects will appear hereinafter.

For the purpose of illustrating the invention there is shown in the drawings a form which is presently preferred; it being understood, however, that this invention is not limited to the precise arrangements and instrumentalities shown.

Referring to the drawings wherein like reference characters refer to like parts:

Figure 1 is a perspective view revealing the projection easel of the present invention in use.

Figure 2 is a plan view of the projection easel of the present invention.

Figure 3 is a section taken on line 3—3 of Figure 2.

Figure 4 is a section taken on line 4—4 of Figure 3.

Figure 5 comprises a strip of positives taken in accordance with the present invention.

Referring to the drawings, the photographic projection easel of the present invention is designated as 10. Photographic projection easel 10 includes the base 12, which is a rectangular board formed of smoothly finished wood, plywood, or the like.

Spaced along the uppermost surface 14 of base 12 are tracks 16 and 18. Tracks 16 and 18 comprise strips of metal having straight sides, and the tracks 16 and 18 are spaced parallel to each other being retained upon the uppermost surface 14 of base 12 by means of retention screws 20. The distance intermediate the juxtaposed edges of tracks 16 and 18 is somewhat greater than the maximum dimension of a wallet-size photographic print (see Figure 5 wherein a plurality of wallet-size photographs are shown, each photograph being designated 22, such photographs being joined on the positive strip 24).

A frame 26 is carried on the uppermost surfaces of the tracks 16 and 18, the frame 26 bridging the tracks 16 and 18. The frame 26 includes the relatively wide end members 28 and 30 and the relatively narrow side members 32 and 34. Thus, end member 28 of frame 26 is secured to track 16 by retention screws 36 and end member 30 is secured to track 18 by retention screws 38. Disposed within frame 26 is the generally rectangular aperture defined by the end members 28 and 30 and the side members 32 and 34. It will be seen from Figure 2 that the end members 28 and 30 project inwardly a small distance from tracks 16 and 18 so that the long dimension of the aperture defined by the frame 26 is somewhat less than the distance intermediate the juxtaposed edges of tracks 16 and 18.

A semicircular notch 40 is spaced closely adjacent the outer edge of side member 32, such semicircular notch being relatively deep adjacent the side member 32 and relatively shallow at its arcuate end which is spaced from side member 32.

A plurality of stop members 42, 44, 46, 48, and 50 are spaced from frame 26. The stop members 42, 44, 46, 48, and 50 are evenly spaced from each other intermediate the tracks 16 and 18, with the stop member 42 being spaced from the side member 32 a distance equal to the distance intermediate any two of the stop members, with such equal distances between the stop members being somewhat larger than the width of the aperture within frame 26.

Each stop member comprises a rectangular strip of metal retained on the uppermost surface 14 by a retention screw 52. Pivotation of the stop members in respect to their retention screws is not possible.

The side members 32 and 34 carry the flaps 54 and 56. The flap 54 is pivotably carried on side member 32 by means of tape 58 which is secured to both side member 32 and the uppermost surface of flap 54. Similarly, flap 56 is pivotably carried on side member 34 by tape 60 which is secured to side member 34 and to the uppermost surface of flap 56. The flaps 54 and 56 are preferably formed of black paper. By forming flaps 54 and 56 of paper and securing them to the side members 32 and 34 in the manner indicated it is possible to readily replace such flaps 54 and 56 when they have become worn through use.

The operation of the photographic projection easel 10 of the present invention is as follows:

A strip 24 of enlarging paper suitable for making positives is passed onto the photographic projection easel 10 in the manner shown in Figures 1 and 2 by inserting such strip 24 intermediate tracks 16 and 18 and beneath the frame 26. Preferably, the portion of the uppermost surface 14 of base 12 beneath the frame 26 may be painted white in the region 62 in order to provide a region in which facile focusing may be accomplished. The strip 24 is advanced beneath the frame 26 until its forwardmost edge engages the operator's forefinger which is retained in the semicircular notch 40 adjacent the side member 32. The flap 54 may be lifted as by pivoting such flap 54 on its tape 58 in the manner shown in Figure 3 in order to permit the operator to insert his finger within the semicircular notch 40.

When the strip 24 has been aligned, in the manner above-indicated, the operator flashes the enlarger designated in Figure 1 as 64 which is disposed above the frame 26 in focused alignment therewith. The enlarger 64 is actuated for a sufficient time period to expose a positive image upon the photographic strip 24. While the enlarger 64 is being actuated, the flaps 54 and 56 are horizontally disposed, protecting the strip 24 from any glare or overlap from the cone of light delivered from the enlarger 64.

After the exposure resulting in the first latent positive image has been effected, the strip 24 is advanced a distance sufficient to bring its forward edge into engagement with the edge of stop member 42 that is adjacent the side member 32. This advances the photographic strip 24 a distance greater than the width of one wallet-size photograph 22, so that borders are formed intermediate the wallet-size photographs 22 on the strip 24 when the same are printed, such borders representing the frame 26.

When the strip 24 has been aligned in the manner indicated, the enlarger 64 is again energized, and a second exposure is made.

Positive strip 24 is again advanced until it meets with the edge of stop member 44 at which time the process is repeated. In order to produce the six photographs shown on the strip 24 in Figure 5, the strip 24 is advanced in the manner indicated from stop member 42 to stop member 44 to stop member 46 to stop member 48 and thence to stop member 50.

The stop members 42, 44, 46, 48, and 50 provide for facile control in the dark, and enable the operator to physically advance the strip 24 the precise distance that is required for proper alignment of a subsequent positive image.

The present invention may be embodied in other specific forms without departing from the spirit or essential attributes thereof and, accordingly, reference should be made to the appended claims, rather than to the foregoing specification as indicating the scope of the invention.

I claim:

1. A projection easel for making a plurality of spaced strip enlargements from sensitized paper, said projection easel including a base, a pair of parallel spaced tracks having juxtaposed straight edges secured on the uppermost surface of said base, an apertured rectangular frame fixedly secured to the uppermost surfaces of said tracks adjacent one end of said base, the width of said frame being smaller than the length of said tracks so that said tracks extend beyond at least one side of said frame, the ends of said frame juxtaposed to said tracks projecting inwardly beyond said tracks a small distance, imperforated flaps secured to the sides of said frame of a dimension covering the sensitized paper from stray light during exposure, the flap adjacent the center of said base being pivotably secured to its frame side and pivotable between a position juxtaposed to the uppermost surface of said base and a position generally perpendicular to said base, and a plurality of evenly spaced stops fixedly secured to the uppermost surface of said base intermediate said tracks, said stops being disposed on said base adjacent the side of said frame which is adjacent to the center of said base, said stops being lower than said tracks but sufficiently high to block the sensitized paper without preventing lifting of the edge of the sensitized paper over the tops of said stops.

2. A projection easel in accordance with claim 1 in which each of the flaps secured to the sides of the frame is pivotable between a position juxtaposed to the uppermost surface of the base and a position generally perpendicular to the base.

3. A projection easel in accordance with claim 1 in which a notch is provided in the base intermediate the tracks and closely adjacent the sides of the frame which is adjacent to the center of the base to accommodate a finger of the operator to be engaged by the forward edge of the sensitized paper strip.

References Cited in the file of this patent

UNITED STATES PATENTS

| | | |
|---|---|---|
| 1,552,127 | Ellingson | Sept. 1, 1925 |
| 1,818,528 | Bern | Aug. 11, 1931 |
| 2,187,381 | Lane | Jan. 16, 1940 |
| 2,219,703 | Spencer | Oct. 29, 1940 |
| 2,823,581 | Greenspan | Feb. 18, 1958 |

FOREIGN PATENTS

| | | |
|---|---|---|
| 661,942 | Germany | June 30, 1938 |
| 57,939 | Netherlands | July 15, 1946 |